United States Patent [19]

Jenkins

[11] 4,433,703
[45] Feb. 28, 1984

[54] PANEL MOUNTED VACUUM CONTROL VALVE

[76] Inventor: Henry H. Jenkins, 864 W. Hacienda Dr., Corona, Calif. 91720

[21] Appl. No.: 367,160

[22] Filed: Apr. 12, 1982

[51] Int. Cl.³ ................. F16K 17/06; F16K 15/18
[52] U.S. Cl. ................. 137/541; 137/360; 137/495; 137/542; 137/543.23; 251/337
[58] Field of Search ............ 137/360, 495, 541, 542, 137/543.23, DIG. 8; 251/337

[56] References Cited

U.S. PATENT DOCUMENTS

| | | | |
|---|---|---|---|
| 2,594,405 | 4/1952 | Deters | 251/337 X |
| 3,338,264 | 8/1967 | Dykzeul et al. | 251/337 X |
| 3,756,273 | 9/1973 | Hengesbach | 137/541 X |
| 3,848,624 | 11/1974 | Banike | 137/542 X |
| 3,971,401 | 7/1976 | Persson | 137/360 |

Primary Examiner—Alan Cohan
Assistant Examiner—John A. Rivell
Attorney, Agent, or Firm—Woodling, Krost and Rust

[57] ABSTRACT

A panel mounted control valve including a housing having a bore with a valve seat formed in the bore. An axially and rotatably movable actuating member which has a valve member thereon is mounted in the bore for movement therein. A nut member is threadably mounted on an end portion of the actuating member and moves axially to compress or decompress a spring which biases the valve member to closed position. A slot is formed in the housing and the walls of the slot are located adjacent opposed flat portions on the nut member to prevent the nut member from rotating but permitting it to move axially.

2 Claims, 4 Drawing Figures

PANEL MOUNTED VACUUM CONTROL VALVE

The present invention relates to the construction of a panel mounted vacuum control valve which can be conveniently secured to the face of a control panel of any of a number of conventional manufacturing machines, for example a vacuum skin packaging machine. The conventional use of such a valve is to control the vacuum within the system of the machine so that if the vacuum exceeds a predetermined value the valve will open dumping the system to atmosphere. In order words, atmospheric pressure is admitted to the system until the predetermined vacuum level is again accomplished at which time the valve system will close.

It is desirable in valves of the type to which the present invention relates, that a control knob or other control mechanism which extends from the face of a panel of a machine using the valve, occupy essentially the same position relative to the face of the panel regardless of the position of the valve at that particular moment. In other words it is desired that the adjustment knob which is manipulated by an operator of the device maintain a relatively consistent and constant position relative to the face of the panel regardless of the setting of the valve.

It is therefore an object of the present invention to provide a panel mounted vacuum control valve which is manipulated by an operator of the valve by means of a knob which is located at the face of the panel and regardless of the position of the valve the control valve occupies the same relative position with respect to the panel.

Another object of the present invention is to provide a vacuum control valve whereby the setting of the valve is accomplished simply by the rotation of a knob attached to an actuating member which serves to readily control the pressure value at which the vacuum valve opens and closes.

Another object of the present invention is to provide a panel mounted vacuum control valve adapted to be connected to a vacuum system where the vacuum system may be conveniently dumped to atmosphere by an operator of the device by simply axially moving a control knob which is attached to an actuating member.

Another object of the present invention is to provide a vacuum control valve which includes a valve member secured to an actuating shaft in combination with a control spring whereby rotation of the actuating member serves to vary the compression of the control spring which in turn varies the force necessary to open the valve member.

Other objects and a fuller understanding of this invention may be had by referring to the following description and claims, taken in conjunction with the accompanying drawings, in which:

Figure 1:
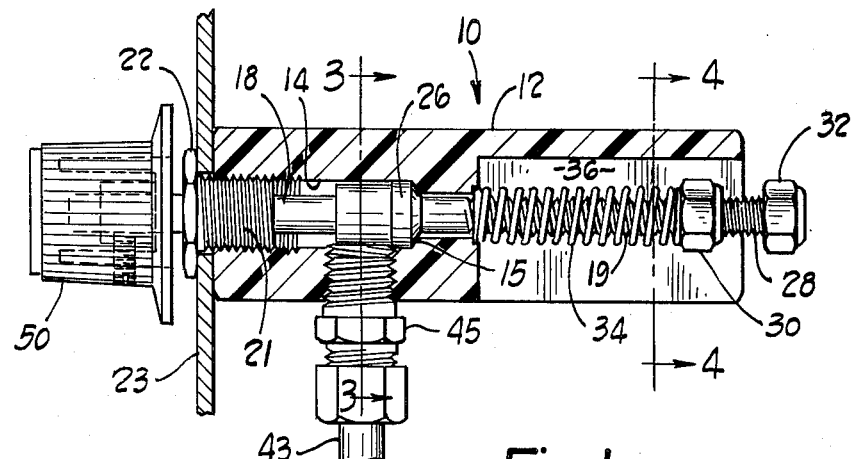
FIG. 1 is an elevational view of the valve of the present invention partially in cross section and illustrating the valve as attached to a panel member.

The present invention illustrated in FIGS. 1, 2, 3 and 4 of the drawings comprises a panel mounted vacuum control valve indicated by the reference numeral 10 appropriately secured to a panel 23 which in most instances would be the control panel of a machine. As mentioned hereinabove an example of a machine with which the present invention is adapted to be used is a vacuum skin packaging machine utilized in the skin packaging or vacuum forming industry.

The valve 10 includes a housing 12 which is provided with wall means serving to define a bore 14 which extends generally axially through the housing. A valve seat 15 is defined in the bore 14 and additionally a rotatable and axially movable actuating shaft 17 is provided in the bore and for identification the shaft is provided with a first end portion 18 and a second end portion 19.

Figure 2:
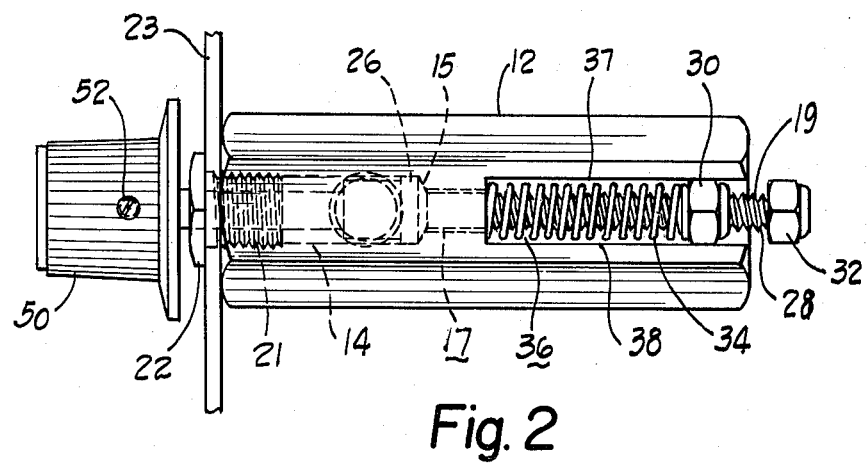
FIG. 2 is a view of the valve showing FIG. 1 taken generally from the bottom of the view of FIG. 1.
Figure 3:
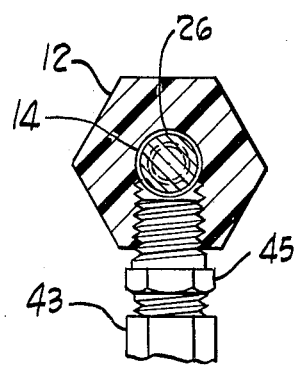
FIG. 3 is a view taken generally along line 3—3 of FIG. 1.
Figure 4:
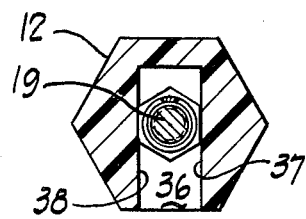
FIG. 4 is a view taken generally along the line 4—4 of FIG. 1.

A threaded panel mounting member 21 is provided and serves to surround the first end portion 18 of the shaft 17 and is threadably attached to corresponding threads in the left end of the bore 14 which serves to secure the panel 23 between a head 22 on the member 21 so that the valve 10 is held essentially in the position shown in FIGS. 1 and 2. A valve member 26 is integrally secured and formed on the shaft 17 so that it moves in accordance with the rotatable and axial movement of the shaft and the valve member is shown in FIGS. 1 and 2 in engagement with the valve seat 15 in a closed position. As viewed in FIGS. 1 and 2 the valve member 26 moves or is capable of moving to the left as seen in these figures to an open position.

The second end portion 19 of the shaft 17 is provided with threads which threadably carry a compression spring nut 30 which is hexagonal in shape as seen in the drawings and therefore has first and second opposed flat portions thereon. The nut is capable of axial movement on the second end portion 19 of the shaft 17 when the shaft 17 is rotated relative thereto. A stop member 32 is mounted on the extreme end 19 of the shaft 17 in a fixed position thereon and serves to limit the axial movement of the nut 30 to the right on the shaft 17 as viewed in FIGS. 1 and 2. A compression spring 34 is provided and extends between the nut 30 and the housing 12 as seen in FIGS. 1 and 2.

The portion of the housing 12 in the area of the spring 34 and the second end portion 19 of the shaft 17 is provided with a slot 36 defined by generally parallel extending walls 37 and 38. The nut 30 is positioned in this slot best seen in FIGS. 2 and 4 with the first and second flat portions of the nut 30 being located respectively adjacent the walls 37 and 38 and this serves to prevent rotation of the nut 30. As a result of this construction when the actuating member is rotated the nut 30 cannot rotate and must move axially with respect to the shaft depending upon the direction of rotation of the shaft. When the shaft is rotated in a clockwise direction as seen from the left end of FIGS. 1 and 2, the nut 30 moves to the left compressing the spring 34 which increases the force necessary to move the valve member 26 off of the seat 15. A conduit 43 and fitting 45 is adapted to fluidly connect the vacuum system of the machine (not shown) to the bore 14 and the portion of the bore 14 which communicates with the slot 36 communicates the bore to atmosphere.

In operation, assuming that the parts of the panel mounted vacuum control valve 10 are located in the positions seen in FIGS. 1 and 2, the vacuum in the system served by conduit 43 will be maintained at a desired vacuum level which will not be exceeded. Assuming that the system exceeds the desired vacuum (negative pressure) which is determined by the compression on spring 34, the valve member 26 and actuating shaft 17 will move to the left as seen in FIGS. 1 and 2 opening the valve and dumping the vacuum system to atmosphere. When the vacuum in the system is thus reduced the valve member will move to closed position.

If it be desired that the valve open under a different value of vacuum all that is necessary is for an operator of the device to grasp the knob 50 which is secured by screw 52 to the first end portion 18 of the actuating shaft, and rotate the same to the right or clockwise viewed from the left end of FIGS. 1 and 2 and the nut 30 will move to the left compressing the spring 34 requiring a higher vacuum level to move the valve member to open position. The reverse rotation of the actuating shaft will permit the valve to be opened at a lesser level of vacuum in the system and this simple manipulation by an operator does not cause the knob 50 to move to a different axial position relative to the face of panel 23. It is true that when the valve member moves to the open position the actuating shaft and the knob 50 are caused to move slightly axially; however, this amount is practically imperceptible. If an operator desires to mechanically dump the vacuum from the system all that the operator need do is grasp the knob 50 to move the actuating shaft axially outwardly and the vacuum can be completely removed manually from the system.

It will therefore be apparent to those skilled in the art that with the construction described in detail hereinabove that the general objects of the invention as enumerated are conveniently and economically carried out.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A panel mounted vacuum control valve including in combination a housing having first and second end portions, first wall means defining a bore in said housing,
   second wall means in said second end portion of said housing defining a slot opening to the exterior of said housing with said slot being defined by first and second generally parallel sidewalls and a connecting wall,
   a valve seat defined in said bore,
   a rotatable actuating shaft extending through said bore and having first and second end portions,
   a threaded panel mounting member surrounding said first end portion of said shaft and threadably attached to said first end portion of said housing and adapted to secure a panel between said panel mounting member and said first end portion of said housing to support said control valve,
   a valve member carried by said shaft and movable between a closed position in engagement with said valve seat and an open position axially spaced from said valve seat,
   said second end portion of said actuating shaft having threads thereon and residing in said slot,
   a compression spring nut having opposed first and second flat portions and being positioned on said threads on said second end portion of said actuating shaft,
   a spring surrounding said second end portion of said actuating shaft and extending between said nut and said housing,
   said first and second opposed flat portions of said nut lying adjacent respectively said first and second spaced and generally parallel sidewalls of said slot to prevent rotation of said nut,
   rotation of said shaft causing axial movement of said nut on said shaft to vary the compression of said spring which determines the force necessary to move said valve member off of said seat from said closed to open positions,
   said bore on said valve member side of said valve seat adapted to be connected to a conduit under vacuum, said valve member in open position communicating said bore to atmosphere,
   said first end portion of said actuating shaft extending outwardly of said panel mounting member, knob means secured to said first end portion of said actuating shaft to enable an operator to rotate said shaft and to move said shaft axially against the urging of said spring to open said valve member and connect said bore on said valve member side of said valve seat to atmosphere.

2. A control valve including in combination a housing having first and second end portions,
   a bore in said housing,
   wall means in said second end portion of said housing defining a slot opening to the exterior of said housing with said slot being defined by first and second generally parallel sidewalls and a connecting wall,
   a valve seat in said bore,
   an actuating shaft having first and second end portions and extending in said bore,
   a valve member movable into and out of contact with said valve seat to close and open said valve,
   said valve member connected to said shaft for movement therewith,
   said second end portion of said shaft having threads thereon in threaded engagement with an axially movable nut member and residing in said slot,
   a spring member biasing said valve member to closed position,
   said nut member having surfaces lying adjacent said first and second generally parallel sidewalls respectively and preventing rotation of said nut,
   said first end portion of said actuating shaft extending outwardly of said first end portion of said housing, knob means secured to said first end portion of said actuating shaft to enable an operator to rotate said shaft and to move said shaft axially against the urging of said spring member to open said valve member and connect said bore on said valve member side of said valve seat to atmosphere,
   rotation of said shaft in a given direction causing axial movement of said nut member and compression of said spring member.

* * * * *